United States Patent Office 3,207,768
Patented Sept. 21, 1965

3,207,768
PROCESS FOR THE MANUFACTURE OF 16β-METHYL DESOXYCORTICOSTERONE AND ITS 21-ACETATE
Giangiacomo Nathansohn, Milan, Italy, and Emilio Testa, Tessin, Switzerland, assignors to Lepetit S.p.A., Milan, Italy, an Italian corporation
No Drawing. Filed Nov. 20, 1962, Ser. No. 239,053
Claims priority, application Italy, May 15, 1962, 9,707/62, Patent 23,415
3 Claims. (Cl. 260—397.47)

The present invention relates to a new process for manufacturing 16β-methyl-desoxycorticosterone 21-acetate of the formula:

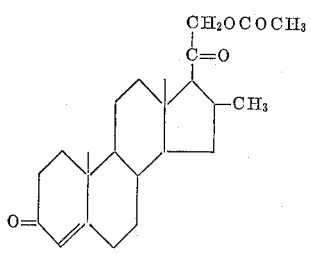

This compound, which possesses hypertensive activity but surprisingly, unlike desoxycorticosterone has substantially no effect on electrolyte metabolism, is also described in our copending application Serial No. 239,054, filed simultaneously herewith.

The new process for producing the above mentioned compound consists essentially in formylating and converting 16-methyl-pregna-5,16-diene-3β-ol-20-one [A. Wettstein, Helv. Chim. Acta 27, 1803 (1944)] into 16-methylpregna-5,16-diene-3β,21-diol-20-enol - acetate and the 21-iododerivate, in hydrogenating the Δ16-double bond with Raney-Nickel and oxidizing the obtained formyl ester by known methods to 16β-methyldesoxycorticosterone 21-acetate.

The reaction scheme is as follows:

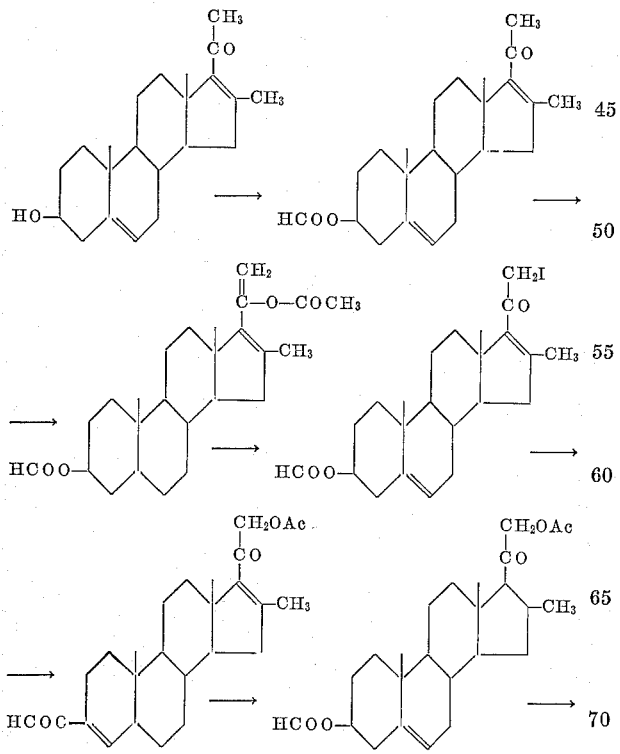

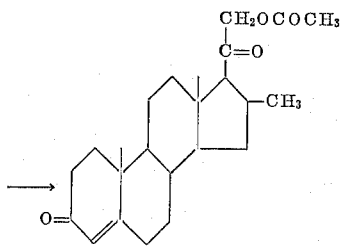

EXAMPLES

*16-methylpregna-5,16-diene-3β-ol-20-one-3-formate*

A solution of 125 g. of 16-methylpregna-5,16-diene-3β-ol-20-one in 1550 ml. of 85% formic acid is heated for 1 hour at 80° C. The solution is poured into 15 litres of ice-water, the separated product is collected, washed to neutrality and dried. 132 g. of a crude product melting at 143–155° C. is recovered and recrystallized from acetone to give 93 g. of 16-methylpregna-5,16-diene-3β-ol-20-one-3-formate.

*16-methylpregna-5,16,20-triene-3β,20-diol-3-formate 20-acetate*

A solution of 45 g. of 16β-methylpregna-5,16-diene-3β-ol-20-one 3-formate in 570 ml. of isopropenyl acetate is heated at the boiling point for 12 hours under stirring in the presence of 6 g. of p-toluene-sulfonic acid.

The isopropenyl acetate mixed with acetone formed during the reaction, is removed on boiling by slow continuous distillation. The distillate of the first 6 hours (83 ml.) is replaced by adding to the reaction solution an equal volume of fresh isopropenyl acetate.

The mixture is cooled to 10° C., diluted with 600 ml. of ethyl ether, the organic solution is washed with 250 ml. of a cold 3% sodium bicarbonate solution and with water to neutrality. The solution is dried over $Na_2SO_4$, concentrated to dryness and the residue taken up with 800 ml. of hexane. The solution is passed through a column containing 80 g. of magnesium trisilicate previously washed with fresh hexane.

The eluate is concentrated to a volume of 150 ml., then 15 ml. of methanol are added. The resulting white crystalline product is filtered, dried (19 g., M.P. 103–113° C.) and recrystallized from methanol, giving 14.5 g. of 16-methylpregna-5,16,20-triene-3β,20-diol-3-formate 20-acetate. Melting point 111–116° C.

*16-methyl-21-iodo-pregna-5,16-diene-3β-ol-20-one 3-formate*

To a suspension of 24 g. of 16-methylpregna-5,16,20-triene-3β-diol-3-formate 20-acetate in 85 ml. of dioxane 15.6 g. of N-iodosuccinimide are added under stirring. The mixture is heated for 45 minutes at 80° C.±5° under a nitrogen stream, then poured into 200 ml. of a cold aqueous solution of 10% sodium metabisulfite. A solid product separates and after a short stirring is collected. Yield: 21 g. of crude 21-iododerivative, melting point 112–120° C.

*16-methylpregna-5,16-diene-3β,21-diol-20-one 3-formate 21-acetate*

To a solution of 19 g. of 16-methyl-21-iodo-pregna-5,16-diene-3β-ol-20-one 3-formate in 240 ml. of acetone 88 ml. of glacial acetic acid are added, followed after cooling to 10–15° C. by 140 ml. of triethylamine. The mixture is refluxed for 45 minutes diluted with 2300 ml. of water and allowed to stand for 1 hour.

Then 20 g. of Celite are added and the solid is collected. The mixture is washed with water and extracted with acetone. The extracts are concentrated to a small volume giving 12 g. of a crystalline compound melting at 155–160° C. From the mother liquors, by concentration and addition of ether another crop of 2.3 g. of product is obtained. The combined crops recrystallized from 95% ethanol give 11.4 g. of 16-methylpregna-5,16-diene-3β,21-diol-20-one 3-formate 21-acetate. Melting point 150–162° C.

*16β-methylpregna-5-ene-3β,21-diol-20-one-3-formate 21-acetate*

A solution obtained by dissolving 8.5 g. of 16-methyl-pregna-5,16-diene-3β,21-diol-20-one-3-formate 21-acetate in 4000 ml. of hot ethanol is rapidly cooled to 30° C. Then 25 g. of Raney-Nickel are added and the mixture is hydrogenated under atmospheric pressure at room temperature, filtered and diluted with methanol. The catalyst is removed by filtration and the resulting solution is concentrated under reduced pressure. The dry white solid residue (9 g. melting point 131–135° C.) is recrystallized from isopropyl ether giving 6 g. of product melting at 139–142° C.

*16β-methylpregna-4-ene-21-ol-3,20-dione-21-acetate (16β-methyldesoxycorticosterone 21-acetate)*

A solution of 6 g. of crude 16β-methylpregna-5-ene-3β,21-diol-20-one-3-formate 21-acetate in 240 ml. of anhydrous toluene and 96 ml. of cyclohexanone is distilled until 40 ml. of toluene is removed. To the completely anhydrous resulting solution 6 g. of aluminium isopropoxide dissolved in 48 ml. of anhydrous toluene are added in 5 minutes. The reaction mixture is refluxed under stirring for 2 hours, then cooled and washed with a saturated solution of Seignette salt, then with a diluted NaOH solution and eventually with water. The organic phase is dried over $Na_2SO_4$, evaporated to dryness and extracted with petroleum ether. After evaporation of the solvent in vacuo the oily residue is slurried with ether; 1 g. of 16β-methyldesoxycorticosterone 21-acetate, melting point 133–140° C. can be separated. The remaining oil is dissolved in benzene and passed through a column of $Al_2O_3$ (50 g.); the elution is conducted with benzene. The first 200 ml. fraction is evaporated and the oily residue (3.2 g.) slurried with petroleum ether. An additional crop of compound, 1.05 g., melting point 130–138 is obtained. Both crops, 2.05 g. are crystallized from methanol; yield 1.9 g. melting point 142–144° C.

We claim:
1. A process for preparing 16β-methyl-desoxycorticosterone 21-acetate, which comprises heating 16-methyl-pregna-5,16-diene-3β-ol-20-one with aqueous formic acid, refluxing the obtained 3-formyl ester with isopropenyl acetate in the presence of p-toluenesulfonic acid, heating the resulting 16-methylpregna-5,16,20-triene-3β,20-diol 3-formate 20-acetate with N-iodosuccinimide, refluxing the crude 16-methyl-21-iodopregna-5,16-diene-3β-ol-20-one 3-formate with acetic acid in the presence of a tertiary aliphatic amine in acetone, hydrogenating the obtained 16-methylpregna - 5,16 - diene-3β,21-diol-20-one 3-formate 21-acetate in the presence of a catalyst and subjecting the obtained 16β-methylpregna-5-ene-3β,21-diol-20-one 3-formate 21-acetate to simultaneous splitting off of the formyl group, oxidation, and shifting of double bond with aluminium isopropoxide in the presence of a ketone.

2. A process as in claim 1, wherein hydrogenation of 16-methylpregna-5,16-diene-3β,21-diol-20-one 3-formate 21-acetate is carried out in the presence of Raney-Nickel.

3. In a process for the preparation of 16β-methyl-desoxycorticosterone and its acetate, the step which comprises heating 16-methyl-21-iodopregna-5,16-diene-3β-ol-20-one 3-formate with acetic acid in the presence of a tertiary aliphatic amine in acetone to obtain the corresponding 21-acetate.

References Cited by the Examiner

UNITED STATES PATENTS

| | | | |
|---|---|---|---|
| 2,802,839 | 8/57 | Ringold et al. | 260—397.47 |
| 2,964,544 | 12/60 | Ringold et al. | 260—397.47 |

LEWIS GOTTS, *Primary Examiner.*